US008526738B2

(12) United States Patent
Yashiro

(10) Patent No.: US 8,526,738 B2
(45) Date of Patent: Sep. 3, 2013

(54) INFORMATION PROCESSING APPARATUS INCLUDING A PLURALITY OF MULTI-STAGE CONNECTED INFORMATION PROCESSING UNITS

(75) Inventor: Satoshi Yashiro, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 775 days.

(21) Appl. No.: 12/604,195

(22) Filed: Oct. 22, 2009

(65) Prior Publication Data

US 2010/0119107 A1 May 13, 2010

(30) Foreign Application Priority Data

Oct. 24, 2008 (JP) ................................ 2008-274443

(51) Int. Cl.
*G06K 9/00* (2006.01)
*G06K 9/36* (2006.01)
(52) U.S. Cl.
USPC .......................................... 382/181; 382/284
(58) Field of Classification Search
USPC ................... 382/103, 118, 181, 227–228, 284
See application file for complete search history.

(56) References Cited

U.S. PATENT DOCUMENTS

| 4,991,019 | A | * | 2/1991 | Enami et al. | 348/721 |
| 5,848,290 | A | * | 12/1998 | Yoshida et al. | 712/26 |
| 5,978,831 | A | * | 11/1999 | Ahamed et al. | 718/105 |
| 7,242,810 | B2 | * | 7/2007 | Chang | 382/227 |
| 8,022,957 | B2 | * | 9/2011 | Ishikawa | 345/505 |
| 2002/0181765 | A1 | | 12/2002 | Mori | |
| 2009/0188727 | A1 | * | 7/2009 | Yeh | 178/20.01 |

FOREIGN PATENT DOCUMENTS

| JP | 2002-358500 A | 12/2002 |
| JP | 2006-350645 A | 12/2006 |
| JP | 2008-026974 A | 2/2008 |

OTHER PUBLICATIONS

Viola, et al. "Robust Real-time Object Detection" pp. 1-24, Jul. 13, 2001.*
Liu, Robot Object Recognition System, Jun. 22, 2008, Media Computing Conference 2008.
"Rapid Object Detection using Boosted Cascade of Simple Features" Proceedings of the IEEE Conference on Computer Vision and Pattern Recognition CVPR'01).

* cited by examiner

*Primary Examiner* — Daniel Mariam
(74) *Attorney, Agent, or Firm* — Canon USA, Inc., I.P. Division

(57) ABSTRACT

An information processing apparatus includes a plurality of information processing units that are connected in stages. Each of the information processing units comprises a plurality of processing units configured to process information and output a processing result and an integration unit configured to input the processing result of one or a plurality of the processing units and output the processing result after integrating the processing result, and changes a connection relation between the output of the processing result from the processing units and the input to the integration unit.

11 Claims, 14 Drawing Sheets

FIG.11

**STANDARD PATTERN (20*20)**

```
1 2 3  ···           20

...

381 382 ···          400
```

**1/2 REDUCED PATTERN (10*10)**

```
401  ···  410
411  ···  420

...

491  ···  500
```

**1/4 REDUCED PATTERN (5*5)**

```
501
 ...
     525
```

INFORMATION PROCESSING APPARATUS INCLUDING A PLURALITY OF MULTI-STAGE CONNECTED INFORMATION PROCESSING UNITS

BACKGROUND OF THE INVENTION

1. Field of the Invention

The present invention relates to an information processing apparatus including a plurality of information processing units that are connected in multiple stages.

2. Description of the Related Art

Image processing methods for automatically detecting a certain object pattern from an image is very useful, for example, in determining a human face. Such image processing methods can be used for various applications including communication conference, man-machine interface, security, monitor/system for tracing a human face, and image compression. A technique for detecting an object from an image is discussed in "Rapid Object Detection using Boosted Cascade of Simple Features" of Proceedings of the IEEE Conference on Computer Vision and Pattern Recognition (CVPR '01).

The above-described document discusses improvement of discrimination accuracy by effectively combining many weak discriminators using AdaBoost. Further, the weak discriminators are connected in series so as to form a cascade detector. Each of the weak discriminators uses a Haar-type rectangle feature quantity in the discrimination. By using an integrated image, each of the weak discriminators can calculate the rectangle feature quantity at a high speed.

The cascade detector removes a pattern that is apparently not an object by using a simple discriminator (i.e., discriminator for a small amount of calculation) arranged at an early stage of the detection. After then, the cascade detector determines whether the remaining patterns are objects by using a discriminator having higher identification capability (i.e., discriminator capable of a large amount of complex calculations) arranged at a subsequent stage. In this way, since the need for performing complex determination on all candidates is unnecessary, the determination can be performed at a high speed.

Generally, in searching an object which is included in an image taken by a digital camera, a field is scanned with a sub-window (frame) of a certain size, and then two-class discrimination is performed. According to the two-class discrimination, whether a pattern image (i.e., image in the sub-window) is an object is determined. Thus, removing a pattern that is not an object at an early stage is key to reducing detection time.

In realizing rapid calculation by hardware implementation, it is necessary to increase the level of parallel processing at the early stages. However, the conventional techniques focus on the reduction of the total amount of calculation processing that is necessary in the detection.

A hardware implementation method that executes parallel processing by using a simple circuit configuration is also discussed in the above-described document. When a plurality of detection processing units and integration processing units, which integrate the result obtained by the processing units, are operated in a parallel configuration, a simple circuit configuration can be realized by connecting the detection processing units and a memory that stores a result of the integration processing at predetermined timing.

However, if an object pattern is automatically detected, probability of a sub-window that is not removed in the early stages depending on the detection object or input image, is changed. In other words, a change occurs in a design value of a passage rate of a sub-window that is determined as likely to be an object in the early stages. Thus, if the level of parallel processing is determined according to the design value, the load of the later stages increases. This may lead to pipeline processing stalls or unnatural circuit operation due to excessively light load. Accordingly, processing that enables efficient operation of a hardware resource has not been achieved.

SUMMARY OF THE INVENTION

The present invention is directed to effectively using a hardware resource and realizing high-speed information processing.

According to an aspect of the present invention, an information processing apparatus includes a plurality of information processing units that are connected in stages. The information processing units include a plurality of processing units configured to process information and output a processing result, an integration unit configured to input the processing result of one or the plurality of the processing units and output the processing result after integrating the processing result, and a change unit configured to change a connection relation between the output of the processing result from the processing units and the input to the integration unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 11 illustrates a relation between a multiresolution pattern and a pixel number.

DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Figure 1:
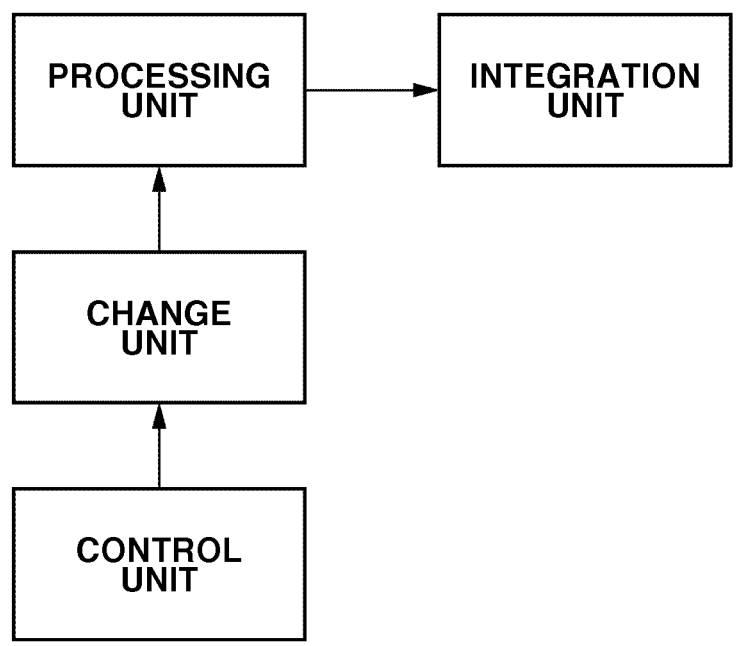
FIG. 1 illustrates an outline of a functional configuration of an image processing apparatus as an example of an information processing apparatus.

FIG. 1 illustrates an outline of a functional configuration of an image processing apparatus as an example of an information processing apparatus.

As illustrated in FIG. 1, the information processing apparatus includes a control unit, a change unit, a processing unit, and an integration unit. Details of processing performed by each unit will be described below.

Figure 2:
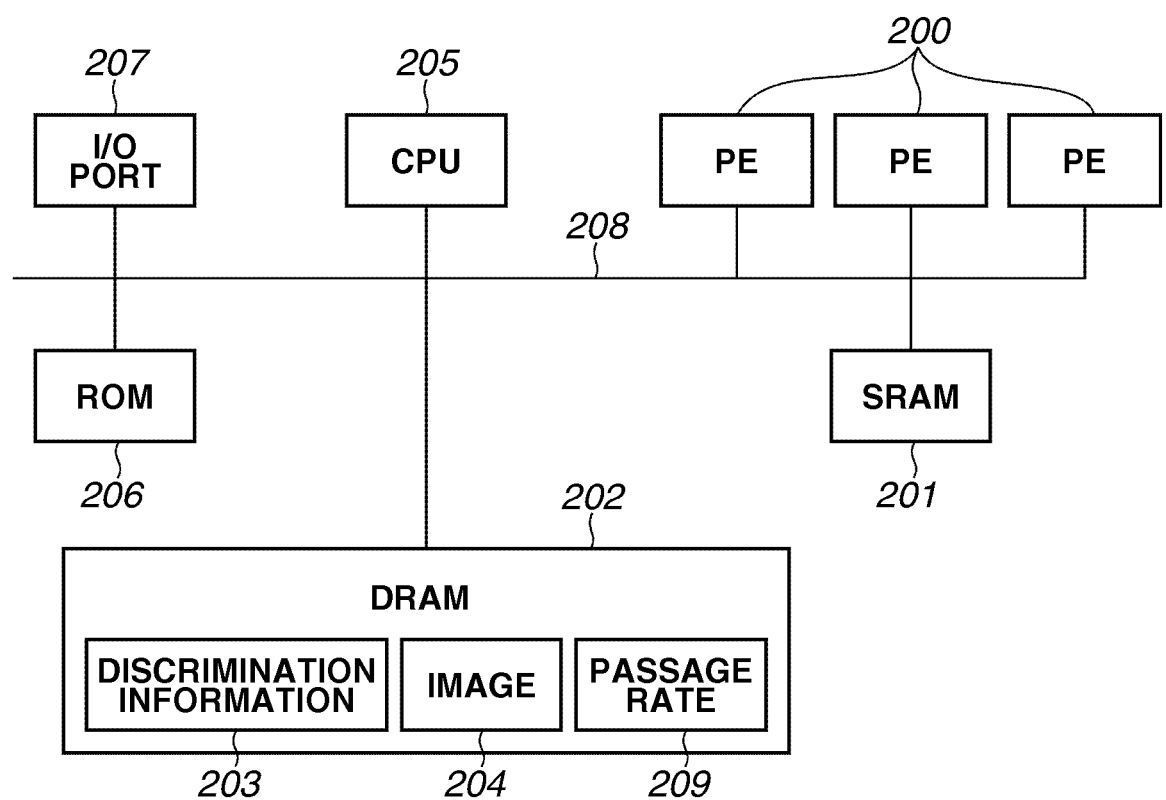
FIG. 2 is an example of a hardware configuration of the image processing apparatus.

FIG. 2 is an example of a hardware configuration of the image processing apparatus.

The image processing apparatus includes a plurality of processor elements (PE) 200, a static random access memory (SRAM) 201, a dynamic random access memory (DRAM) 202, a central processing unit (CPU) 205, a read-only memory (ROM) 206, and an I/O port 207. All of these components are connected via a bus 208. Thus, data is input and output via the bus 208.

The PE 200 performs a predetermined amount of processing by parallel processing. Information that is common to all the PE 200 is stored in the SRAM 201. Information including discrimination information 203, image data (image) 204, and a passage rate 209, is temporarily stored in the DRAM 202. Discrimination information 203 defines an object that is to be detected by the image processing apparatus. Image data (image) 204 is input into the image processing apparatus.

The CPU 205 controls the parallel processing performed by the PE 200, integration of the result of the processing performed by the PE 200, image processing, and data input/output to and from each unit. A program of the present embodiment, a control program, discrimination information used for discriminating each object according to type, and other data are stored in the ROM 206. The I/O port 207 inputs/outputs image data and processing result to and from an external system.

Each of the plurality of the PE 200 includes a circuit having same processing performance.

Figure 3:
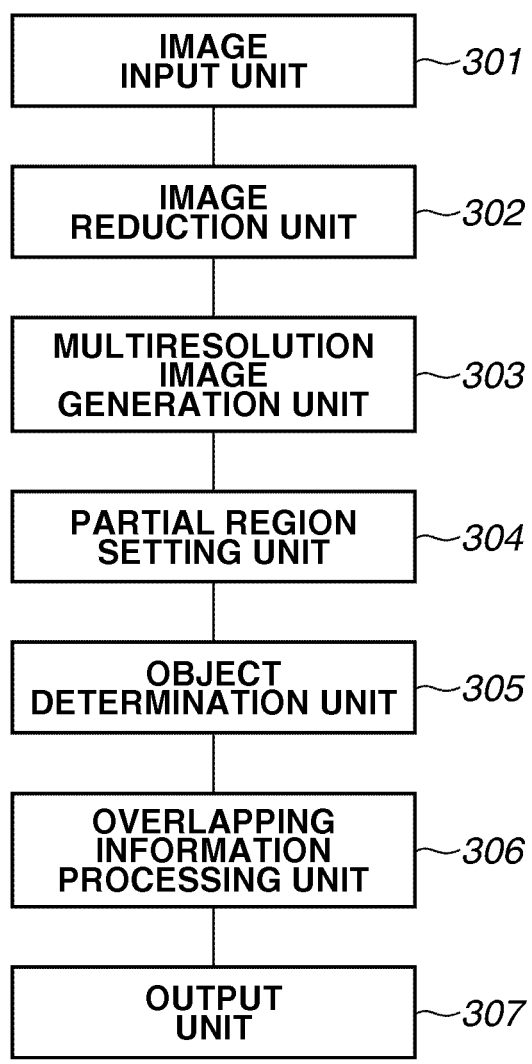
FIG. 3 is an example of a functional configuration of the image processing apparatus.

FIG. 3 is an example of a functional configuration of the image processing apparatus.

First, an image input unit 301 inputs image data. The image data that is input is, for example, data on two-dimensional arrangement of pixels represented by 8-bit R, G, and B signals. If the image data is compressed by JPEG (joint photographic experts group) compression, the image input unit 301 decompresses the image data according to a predetermined decompression method so that RGB pixel data is obtained. Further, according to the present embodiment, the image input unit 301 converts the RGB data into luminance data and stores the data in an image memory 20. The luminance image data is used in the subsequent processing. If the input data is in YCrCb format, the image input unit 301 uses the Y component directly as the luminance data.

Next, an image reduction unit 302 generates luminance image data that is image data reduced to a predetermined size. According to the present embodiment, since detection of various face sizes is performed, a plurality of images of different sizes are sequentially detected. For example, the image reduction unit 302 sequentially performs reduction processing of a plurality of images whose magnification is 1.2 times different, for the detection processing which is to be performed in the later stage.

Next, a multiresolution image generation unit 303 generates a multiresolution image to rapidly obtain A ½- or a ¼-reduced image of an image in a pattern region.

Figure 4:
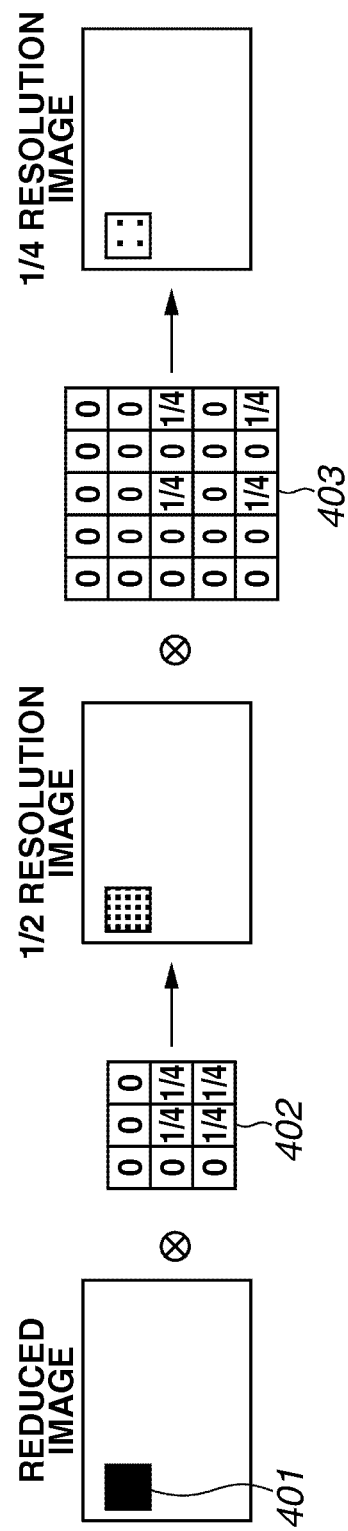
FIG. 4 is an example of a generation of a multiresolution image.

The generation processing is illustrated in FIG. 4. FIG. 4 is an example of a generation of the multiresolution image. As illustrated in FIG. 4, the multiresolution image generation unit 303 generates a ½ resolution image 402 by filtering the entire region of a reduced image 400 by a filter 401 using convolution. Further, the multiresolution image generation unit 303 generates a ¼ resolution image 404 by filtering the ½ resolution image 402 by a filter 403 using convolution.

Next, a partial region setting unit 304 sets a partial region of a predetermined size over the reduced luminance image. The setting process is illustrated in FIG. 5.

Figure 5:
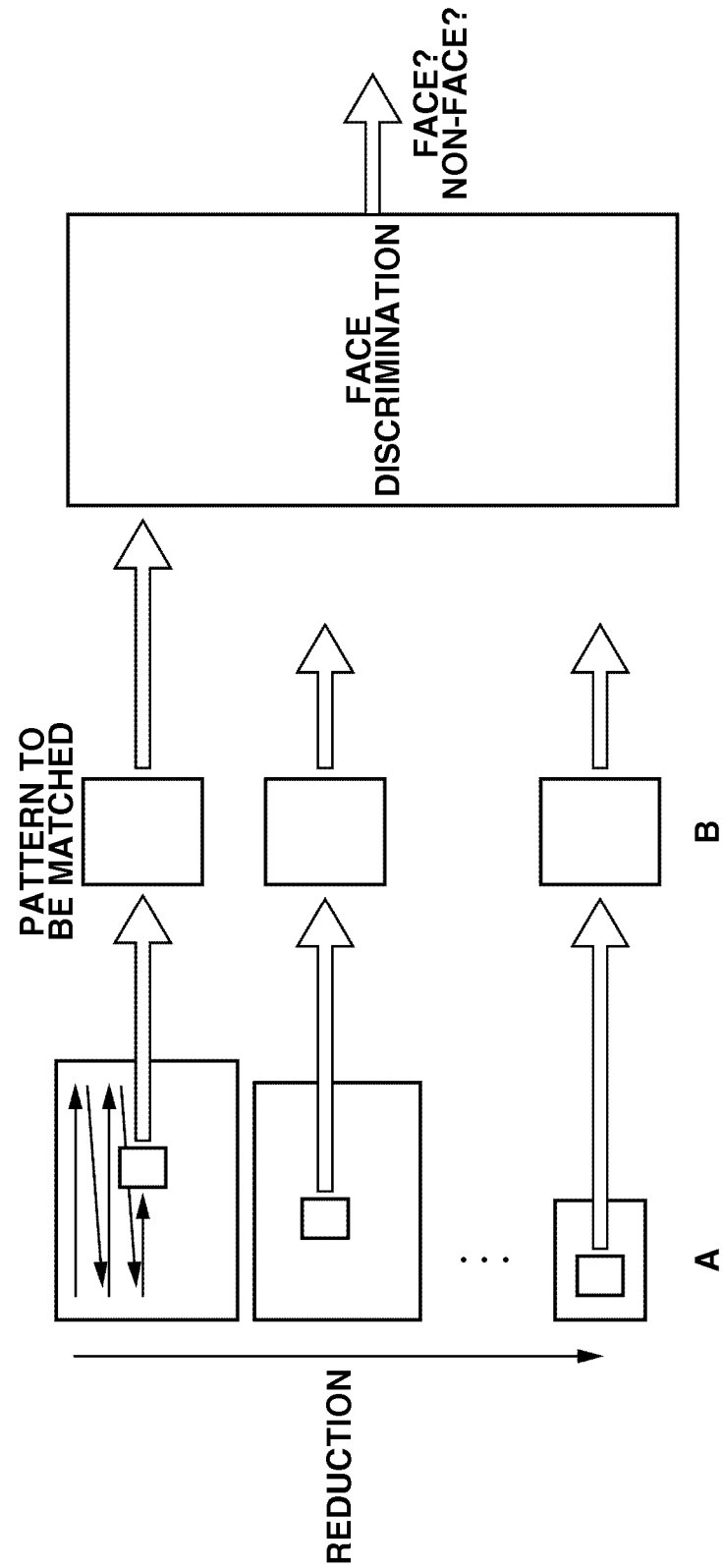
FIG. 5 is an example of partial region setting.

FIG. 5 is an example of setting processing of a partial region. Images in the row "A" in FIG. 5 are images that are reduced by the image reduction unit 302. The partial region setting unit 304 defines a rectangular region of a predetermined size from each of the reduced images. Images in the row "B" in FIG. 5 illustrate the setting of the images when the partial region setting unit 304 repeatedly scans each of the reduced images from right to left and from top to bottom in a sequential manner. In performing the face discrimination, if a matching pattern region is set from an image that is reduced by a greater reduction ratio, as can be seen from FIG. 5, a face that is large with respect to the image will be detected.

Next, an object determination unit 305 determines whether the matching pattern is a face pattern or a non-face pattern. Details of this processing will be described below. When all the scanning of the partial region setting unit 304 is completed, an overlapping information processing unit 306 performs overlapping information processing of the partial region that has been determined as an object. This processing is performed since a plurality of partial regions in the vicinity of the actual object are also determined as a part of the object. Next, an output unit 307 outputs the pattern that is determined as a face to the display device as the face region.

Figure 6:
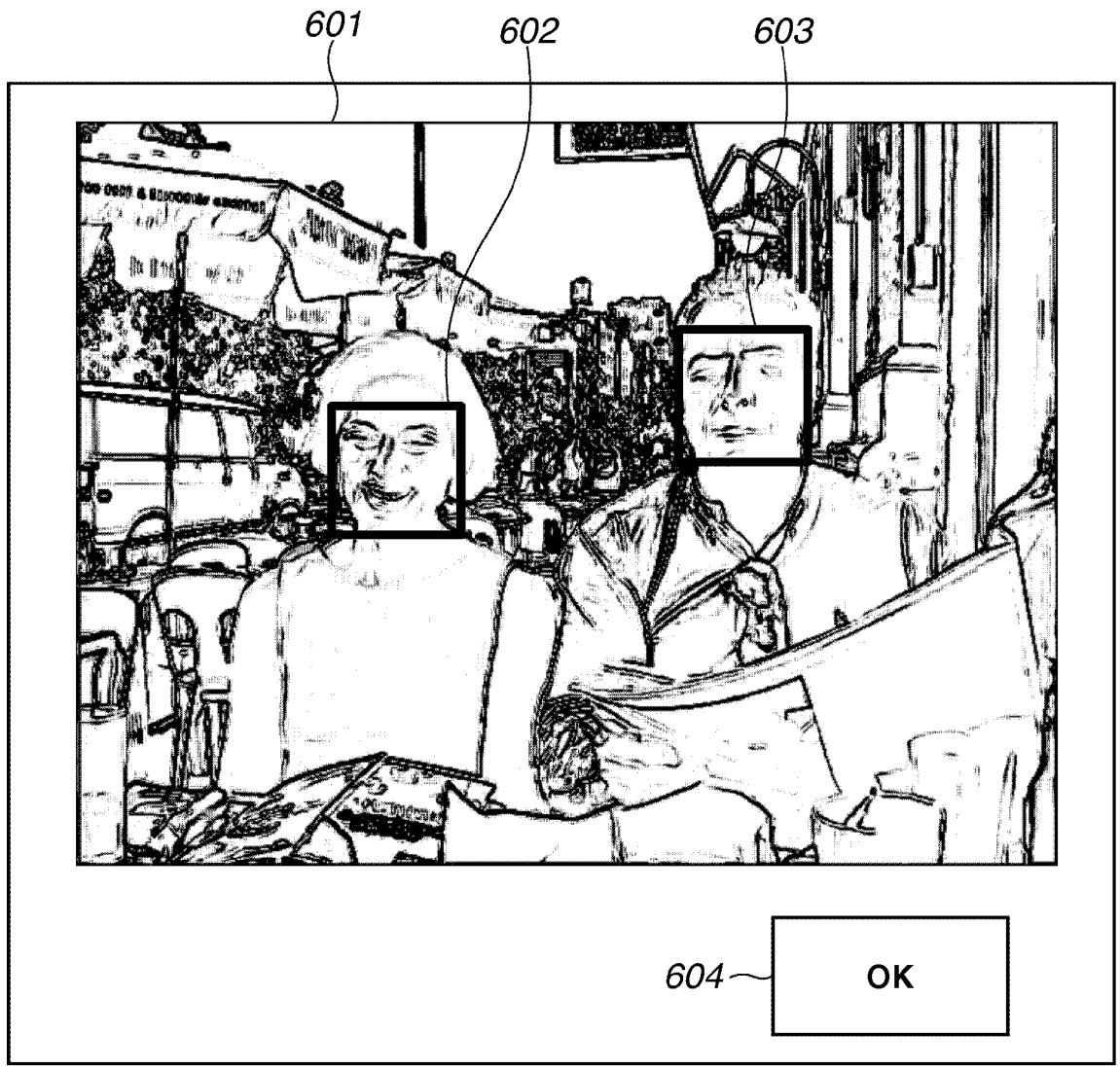
FIG. 6 is an example of a display screen.

FIG. 6 is an example of a display screen where a detection result of a face is superposed on an input image 601 and output on the screen. Frames 602 and 603 indicate the positions and the sizes of the face patterns that are extracted by the object determination unit 305. Further, an OK button 604 is a button for ending the object determination processing.

Figure 7:
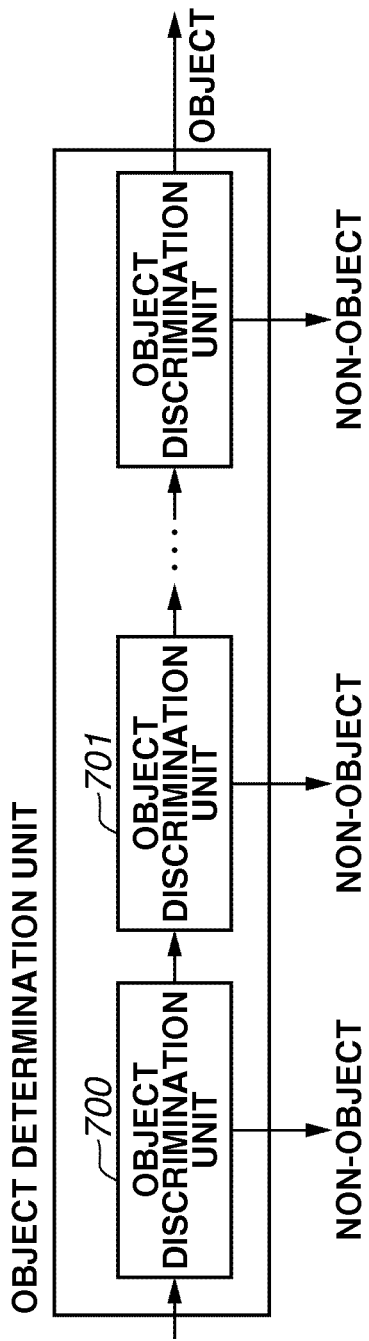
FIG. 7 is an example of an object determination unit.

Next, an object determination performed by the object determination unit 305 will be described in detail. FIG. 7 illustrates an example of the object determination unit 305.

The object determination is realized by a plurality of object discrimination units which are connected in series. The object determination unit 305 determines whether the pattern data that is input into an object discrimination unit 700 is an object. Only when the pattern data is determined as an object, an object discrimination unit 701 in the subsequent stage determines again whether the pattern data is an object at accuracy higher than that performed in the preceding stage. Each of the object discrimination units and each of the weak discrimination units included within the object discrimination units have a similar configuration. Only the number of the weak discrimination units in the object discrimination units and the discrimination parameters are different. The object discrimination unit in the subsequent stage includes more weak discrimination units than the object discrimination unit in the preceding stage.

Figure 8:
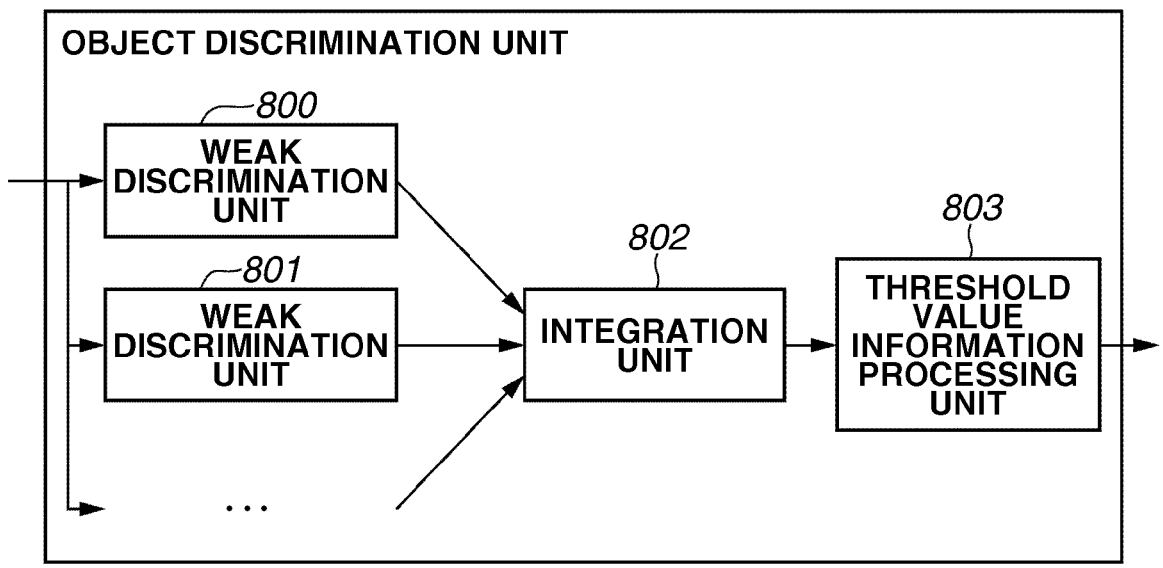
FIG. 8 is an example of an object discrimination unit.

Next, the object discrimination unit 700 will be described in detail. FIG. 8 is an example of the object discrimination unit. The object discrimination unit includes a plurality of weak discrimination units 800 and 801 as well as an integration unit 802 that integrates the output from the weak discrimination units, and a threshold value information processing unit 803. The number of the weak discrimination units depends on the object discrimination unit. The object discrimination unit in the subsequent stage tends to include more weak discrimination units than the object discrimination unit in the preceding stage.

Each of the weak discrimination units 800 and 801 evaluates the pattern (pattern data) by a different method and outputs an object likelihood (processing result). The weak discrimination units 800 and 801 use different discrimination information for the processing, however they have a same configuration. Details of the processing will be described below.

The integration unit 802 obtains a sum of the object likelihood output from the plurality of weak discrimination units 800 and 801 included within each object discrimination unit.

$$H = \Sigma t H t, N \quad (1)$$

The subscripts t,N denote the t-th weak discrimination unit of the N-th object discrimination unit. Ht,N denote the object likelihood of the t-th weak discrimination unit of the N-th object discrimination unit.

The threshold value information processing unit 803 compares the sum of the object likelihood and a predetermined threshold value. If the equation (2) is true, then the pattern is determined as an object. If the equation (2) is false, then the pattern is determined as not an object.

$$H > ThN \quad (2)$$

ThN denotes a threshold value.

Figure 9:
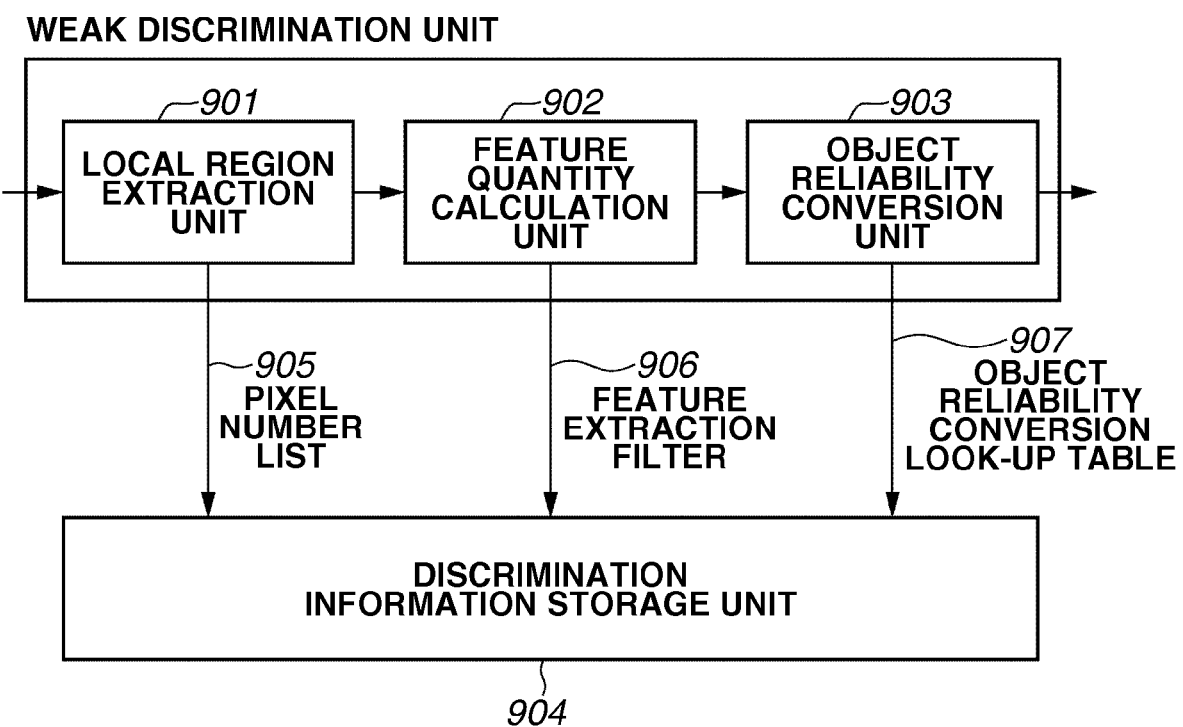
FIG. 9 is an example of a weak discrimination unit.

Next, the weak discrimination unit 800 will be described. FIG. 9 is an example of the weak discrimination unit.

The weak discrimination unit 800 includes a local region extraction unit 901, a feature quantity calculation unit 902, and an object reliability conversion unit 903. Some of the discrimination information 203 is supplied to each of the units from a discrimination information storage unit 904.

Figure 10:
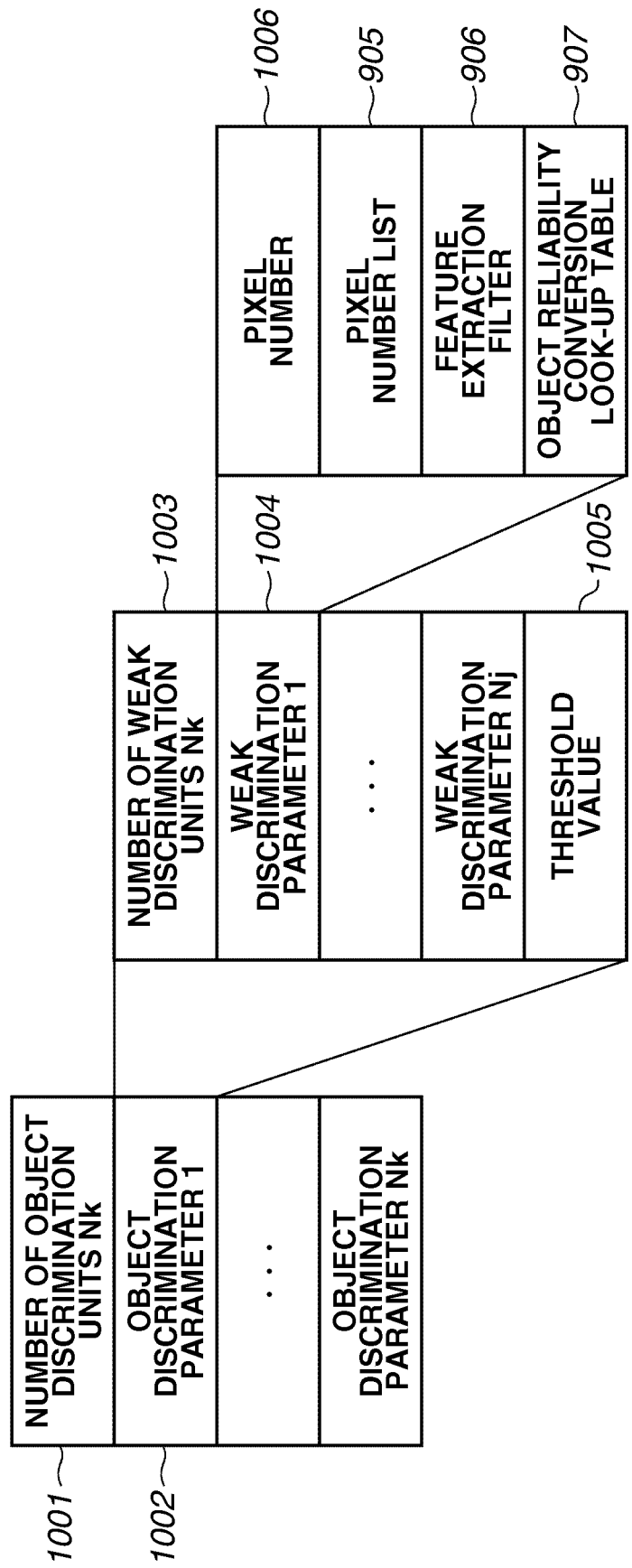
FIG. 10 is an example of discrimination information.

Next, the discrimination information 203 that is stored in the discrimination information storage unit 904 will be described. FIG. 10 is an example of the discrimination information 203.

The discrimination information 203 is information that is necessary in the detection of a certain object. The discrimination information 203 includes an object discrimination unit number 1001 and object discrimination parameters 1002. The number of the object discrimination parameters 1002 corresponds to the number of the object discrimination unit number 1001.

Each of the object discrimination parameters 1002 includes parameters concerning one object discrimination unit. Each of the object discrimination parameters 1002 includes a weak discrimination unit number 1003, weak discrimination parameters 1004, and a threshold value 1005. The number of the weak discrimination parameters 1004 corresponds to the number of the weak discrimination unit number 1003.

Each of the weak discrimination parameters 1004 includes parameters concerning one weak discrimination unit. Each of the weak discrimination parameters 1004 includes a pixel number 1006 of each local region, a pixel number list 905 including a pixel number in a local region, and a feature extraction filter 906. The number of lines of the feature extraction filter 906 corresponds to the pixel number 1006 and the number of columns is 1. Additionally, each of the weak discrimination parameters 1004 includes an object reliability conversion look-up table 907 which is a table concerning conversion from feature quantity into object reliability.

According to the present embodiment, a face pattern is a 20×20 pixel pattern including an eye and a mouth, as illustrated in FIG. 11. Further, a 10×10 pixel pattern is formed by reducing this pattern to ½, and a 5 pixel×5 pixel pattern is formed by reducing the pattern to ¼. Then, pixel numbers from 1 to 525 are assigned to all the pixels, respectively. The multiresolution images formed by the image processing apparatus bring about two advantages. If the resolution is low, positional relation of the parts of a face can be effectively determined. On the other hand, if the resolution is high, partial features of a face can be accurately matched.

The local region extraction unit 901 reads the reference pixel in the pattern based on the pixel number list 905.

The reading method of the pixels of a reduced pattern will be described referring to FIG. 4. In FIG. 4, an 8×8 pixel pattern is used to simplify the description. The ½ resolution image 402 and the ¼ resolution image 404 have a same horizontal and vertical size as the reduced image 400. If a pixel in an 8×8 pixel pattern region 405 is referred from the reduced image 400, then a ½-resolution 4×4 pixel pattern image 406 will be equal to a pattern whose pixel is arranged every two pixels from the same region as presented by black spots in the ½ resolution image 402. Similarly, a ¼-resolution 2×2 pixel pattern image 407 will be equal to a pattern whose pixel is arranged every four pixels from the same region in the ¼ resolution image 404.

The feature quantity calculation unit 902 calculates a local feature quantity Ut according to the following equation (3).

$$Ut,N = \varphi t,N T zt,N \quad (3)$$

The subscripts t,N denote the t-th weak discrimination unit of the N-th object discrimination unit. Ut,N denotes a numerical value indicating local feature quantity of the t-th weak discrimination unit of the N-th object. φt,N denotes the feature extraction filter 906 of the t-th weak discrimination unit of the N-th object. zt,N denotes a number of lines corresponding to a number of luminance pixels of a pattern or a reduced pattern that is included in the pixel number list 905 obtained by the local region extraction unit 901, and of the t-th weak discrimination unit of the N-th object. zt,N represents one column of a matrix.

Next, the object reliability conversion unit 903 converts the local feature quantity Ut,N into object reliability according to the following equation (4).

$$Ht,N = ft,N(Ut,N) \quad (4)$$

Ht, N denotes an output of the object reliability of the t-th weak discrimination unit of the N-th object. ft,N denotes an output of the weak discrimination unit where the local feature quantity Ut,N is converted into object reliability according to the object reliability conversion look-up table 907.

If the local feature Ut,N is above the upper limit or falls below the lower limit, the object reliability conversion unit 903 sets the local feature quantity to the upper limit or the lower limit, and then obtains the object reliability referring to the table.

According to the present embodiment, a predetermined resolution, a predetermined size, and linear identification feature of the local region of the matching pattern are used as local feature quantities.

Figure 12:
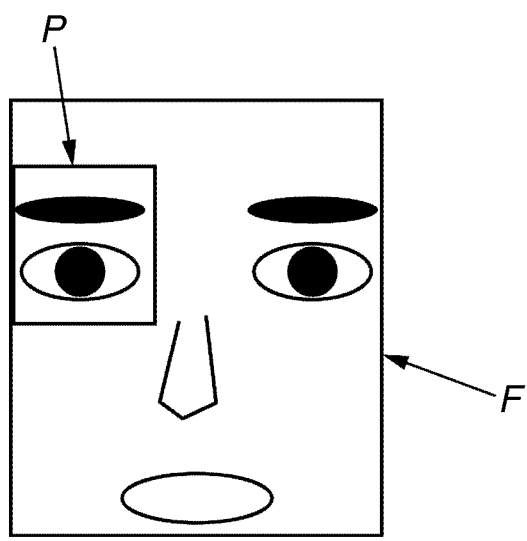
FIG. 12 is an example of a local region of a face.

As illustrated in FIG. 12, if a 20×20 pixel luminance pattern is a matching pattern F, a square 5×5 pixel local region, which is a part of the matching pattern F will, be a local region P. In this case, if the local region P is set for all the pixel positions in the matching pattern F, then a total of 256 local regions are generated.

Figure 13:
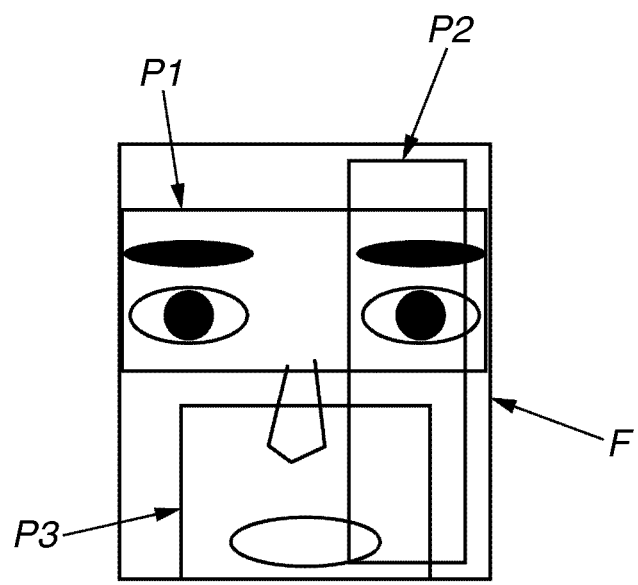
FIG. 13 is an example of a different local region of the face.

In addition to the square local regions, the image processing apparatus can also use a combination of local regions having various shapes and sizes such as a horizontally-long rectangle, a vertically-long rectangle, and an ellipse. Examples of such local regions are illustrated as local regions P1, P2, and P3 in FIG. 13. Further, the image processing apparatus can reduce the original matching pattern, generate various low-resolution matching patterns, and use a combination of the local regions of the matching patterns having various resolutions. Further, the image processing apparatus can use a plurality of dispersed areas/pixels.

As described above, the object discrimination units can have the same configuration regardless of the object of the detection (discrimination). Thus, before changing the detection object, the discrimination information 203 is prepared for each object. Then, the object discrimination unit that will be used to change the detection object will have the number of object discrimination units and the number of weak discrimination units that are included in the discrimination information 203.

According to the above-described processing, the PE 200 executes processing of one or a plurality of weak discrimination units and local integration processing of the object likelihood that is output by the one or a plurality of weak discrimination units in a predetermined period of time. An integer multiple of processor elements are included in each object discrimination unit. The number of the necessary processor elements depends on the complexity of the object discrimination unit.

Each object discrimination unit can make full use of the processor elements if the discrimination performance is finely adjusted at the time it is designed. The number of the weak discrimination units and the discrimination performance are in a trade-off relation. The discrimination performance is lower when the passage rate is higher. On the other hand, the discrimination performance is higher when the passage rate is lower. The overall discrimination performance can be determined by increasing or decreasing the number of stages of the object discrimination unit or by making fine adjustment of the complexity in the final stage. Since the content of the processing performed by each processing unit is the same, the processing can be synchronously performed.

Figure 14:
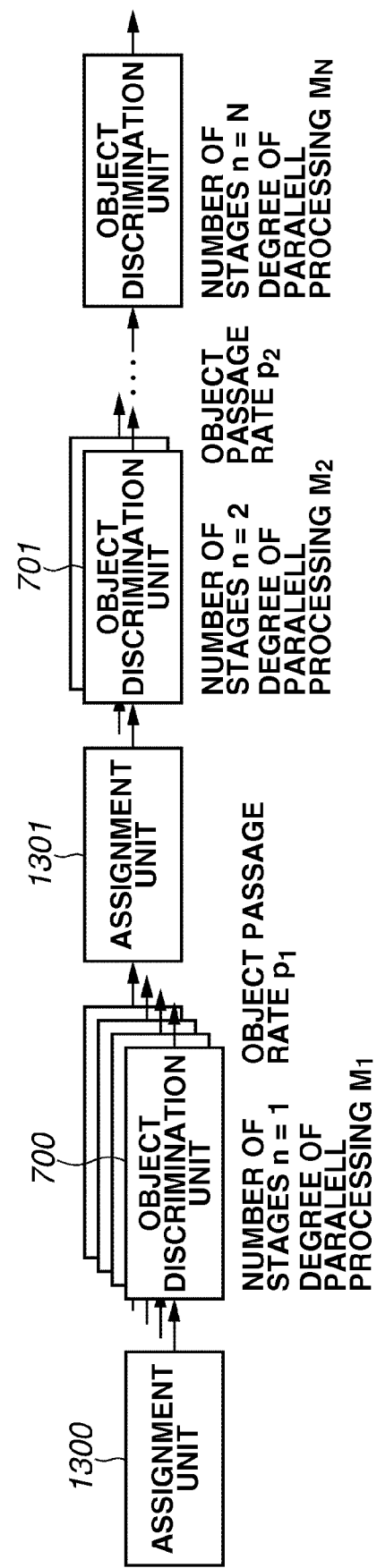
FIG. 14 is an example of parallelized object discrimination units.

Next, the parallelization method in implementing the object determination unit as hardware will be described. FIG. 14 is an example of object discrimination units 700 and 701 that are parallelized.

As illustrated in FIG. 14, the image processing apparatus includes parallelized object discrimination units that are arranged in stages. Assignment units 1300 and 1301 are provided before the object discrimination units 700 and 701, respectively. Each of the assignment units assigns the discrimination processing to the parallelized object discrimination unit. If the level of parallel processing is insufficient to deal with the amount of input, the assignment units 1300 and 1301 store the input information in a processing queue and wait for the next processing to start.

Regarding the object discrimination units that are serially connected, since the number of processing times of the object discrimination units at the early stage is greater, it is necessary to increase the level of parallel processing at the early stage. If the time for performing one discrimination processing by the object discrimination unit at each of the parallelized stage is the same, the control unit controls the level of parallel processing so that ε is minimized according to the following equation (5).

$$\varepsilon = \sum_{k=1}^{N} w_k \left| \frac{\bar{P}}{\bar{M}} - \frac{P_k}{M_k} \right|. \quad (5)$$

where $$P_k = \prod_{i=1}^{k} p_i \quad (6)$$

Here, Mn denotes the level of parallel processing at the n-th stage of the object discrimination units that are serially connected. pk denotes a probability that a pattern is determined as the object in relation to an input number in the "k−1"-th stage.

Probability p1 is 1 since it is the probability of the first stage. Probability pk denotes a probability of a pattern to be determined as an object in the "k−1"-th stage in relation to the input number in the first stage. Wk denotes a weighting factor based on complexity of the object discrimination unit. Wk is also a number of the processor units (PE 200) that is necessary to advance the level of parallel processing of the object discrimination unit by 1 at the k-th stage. $\bar{P}$ denotes an average probability of the stages. $\bar{M}$ denotes an average level of parallel processing of the stages.

The passage rate 209 is a rate that a designer previously determines for each object discrimination unit according to the object to be detected when the designer designs the object information. The change unit can assign the passage rate 209 to pk. If the detection object is switched, the change unit or the like updates the passage rate to a corresponding rate. Further, since the passage rate of each stage greatly changes depending on the input image, the assignment unit detects the passage rate at a nearest predetermined time during the processing of the input image. Then, based on the passage rate that is detected by the assignment unit, the control unit dynamically changes the discrimination information via the change unit or the like, and updates the connection relation between the output of the processing result of the weak determination unit and the input of the integration unit. The equation (5) is only an example of an index calculation based on the passage rate.

Next, processing of the change unit will be described in detail.

The change unit changes the discrimination information that is supplied to each PE 200 (i.e., a processing unit), and changes the role of the processing unit by changing the connection between the output of the PE 200 and the input to the integration unit 802. For example, the change unit changes the connection by switching a memory address of the discrimination information or a memory address of the input information of the integration unit 802.

Next, the control unit that controls the change method of the change unit will be described in detail.

The control unit reassigns the processing resources (processing units) from a stage where the processing load is light to a stage where the processing load is heavy.

According to the following equation (7), if the level of parallel processing is low with respect to the content of the processing, the level of the parallel processing of the stage presented by k increases. On the other hand, if the level of parallel processing is high with respect to the content of the processing, the level of the parallel processing of the stage presented by k decreases.

$$b_k = w_k \left( \frac{\bar{P}}{\bar{M}} - \frac{P_k}{M_k} \right) \quad (7)$$

The control unit reassigns the processing resources from the stage where the value is the largest to the stage where the value is the smallest according to the equation (7). In other words, the control unit increases the level of parallel processing of the stage by 1 where the level is insufficient. Thus, the control unit opens up the stage having the excess level of parallel processing and secures the processing resources. At this time, in advancing the level of the parallel processing by 1, the later stages need more processor elements. Thus, in assigning the processing resources from the early stage to the later stage, the control unit needs to disorganize a plurality of object determination units in the early stage. Accordingly, disorganization of the object determination units will be performed in order starting from those having excess level of parallel processing.

Further, in assigning the processing resources from the later stage to the early stage, if the control unit disorganizes one later stage, the control unit can advance the level of parallel processing by two or more. Further, since the number of the processing resources that are obtained and the number of the processing resources whose roles are changed are not equal, the control unit can use the excess resources when the change is made the next time or later.

The role change (i.e., the above-described connection change or reassignment of the processing unit) can be performed by the control unit each time the parameters are changed completely and an object to be detected is changed or each time a change occurs according to a change in a passage rate at a nearest predetermined time.

The role change can be limited by various conditions. The control unit does not always need to minimize $\epsilon$ in a single role change while one input image is being processed. Thus, the number of processor elements or the number of the integration units 802 to be changed at a time is desirably limited. Further, in the equation (7), if the maximum value is below a predetermined threshold value, the change is unnecessary. Furthermore, the control unit may reassign the processing resources in the range between the upper and lower limits of the level of parallel processing that is set in advance for each stage. The change "at a time" can be performed either when the passage rate changes or when the processing unit has made a number of n (n is integer of 1 or greater) determinations.

Although a program is stored in the ROM 206 according to the first exemplary embodiment, processing similar to the first exemplary embodiment can also be realized by reading a similar program from the I/O port and loading it to the DRAM 202.

Although face extraction has been used in describing the above-described embodiment, the above configuration and processing can be used for arbitrary objects other than a face. For example, the above-described embodiment can also be applied to an entire human body, an upper half of human body, a living thing, and an automobile. In the fields of industry and distribution, the above-described embodiment can be used in identifying or inspecting a product, a part, or a commercial product.

Further, a processing wait queue can be arranged in the assignment unit of each stage. The assignment unit can detect a passage rate based on the number of processing items that remain in the queue. At that time, the control unit can control the change unit so that the level of parallel processing of a stage showing a greater wait number is increased and the level of parallel processing of a stage showing a smaller wait number is decreased.

Although the weak discrimination unit according to the first exemplary embodiment acquires a local feature quantity and includes an object reliability conversion unit, the weak discrimination unit is not limited to such a unit. According to the above-described document, a feature quantity that is similar to Haar is obtained, and then it is determined with a predetermined threshold value whether the feature quantity indicates an object. Then a weighted value is output from the weak discrimination unit. The weak discrimination units can have a same configuration, and further, a position, size, type, threshold value, and weight of the Haar feature can be stored in the discrimination information storage unit 904. Thus, processing of one or a plurality of weak discrimination units can be performed by the PE 200, and the control unit can control the level of parallel processing (i.e., control the role of processing).

The object determination unit according to the first exemplary embodiment includes a plurality of object discrimination units that are connected in series. The object discrimination units, however, are not necessarily connected in series. A plurality of object discrimination units can be configured to form a tree structure so that, according to a result obtained from the object discrimination unit of the preceding stage, the processing can be branched to one of the object discrimination units in the subsequent stage. In this case also, the equation (5) can be used to obtain the passage rate.

Further, the control unit can control the level of parallel processing (control the role of processing) based on a number of calls, in a method for controlling parallelization of image processing. According to this method, processing that is performed at a later stage is determined according to a result of processing that is performed at the early stage, and the number of calls changes according to the processing result.

According to the above-described exemplary embodiment, high-speed information processing with respect to a hardware resource can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-274443, filed Oct. 24, 2008, which is hereby incorporated by reference herein in its entirety.

What is claimed is:

1. An information processing apparatus comprising:
a plurality of information processing units connected in stages;
wherein at least one of the information processing units comprises a plurality of processing units configured to process information and output a processing result;
an integration unit configured to input processing results of more than one of the processing units as an input and integrate the input processing results; and
a change unit configured to change a connection relation between the output of the processing units and the input to the integration unit based on a processing load.

2. The information processing apparatus according to claim 1, further comprising a passage rate detection unit configured to detect a passage rate concerning the information processing unit, wherein the change unit changes the connection relation based on the passage rate detected by the passage rate detection unit.

3. The information processing apparatus according to claim 2, wherein the passage rate detection unit detects the passage rate at predetermined time intervals.

4. The information processing apparatus according to claim 1, wherein the information processing unit is an object discrimination unit that discriminates an object in an image, and wherein if a type of the object to be discriminated by the object discrimination unit is changed, the change unit changes the connection relation based on a passage rate that is set in advance and corresponds to the type of the object that is changed.

5. The information processing apparatus according to claim 1, wherein the information to be processed includes image information and the plurality of information processing units configured to detect an object from the image information.

6. An information processing apparatus comprising:
a plurality of information processing units connected in stages,
wherein at least one of a plurality of processing units is assigned to a respective one of the plurality of information processing units, each of the processing units configured to process information and output a processing result;
a detection unit configured to detect a processing load of the plurality of processing units; and
a change unit configured to change assignment of the plurality of processing units to the plurality of information processing units based on the detected processing load.

7. The information processing apparatus according to claim 6, wherein the change unit configured to change the assignment of the plurality of processing units by changing a connection relation of inputs and outputs of the processing units.

8. The information processing apparatus according to claim 6, wherein the detection unit configured to detect a passage rate concerning the information processing unit as the processing load.

9. The information processing apparatus according to claim 8, wherein the detection unit detects the passage rate at predetermined time intervals.

10. The information processing apparatus according to claim 6, wherein the information to be processed includes image information and the plurality of information processing units configured to detect an object from the image information.

11. The information processing apparatus according to claim 10, wherein if a type of the object to be detected by the plurality of information processing units is changed, the change unit changes the assignment based on a passage rate that is set in advance and corresponds to the type of the object that is changed.

* * * * *